(12) United States Patent
Takata

(10) Patent No.: US 10,910,657 B2
(45) Date of Patent: Feb. 2, 2021

(54) FUEL CELL SEPARATOR AND METHOD FOR PRODUCING THE SAME

(71) Applicant: TOYOTA JIDOSHA KABUSHIKI KAISHA, Toyota (JP)

(72) Inventor: Satoshi Takata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/202,185

(22) Filed: Nov. 28, 2018

(65) Prior Publication Data
US 2019/0198891 A1 Jun. 27, 2019

(30) Foreign Application Priority Data
Dec. 21, 2017 (JP) .................. 2017-244750

(51) Int. Cl.
*H01M 8/0228* (2016.01)
*H01M 8/0215* (2016.01)
*H01M 8/0221* (2016.01)
*H01M 8/0206* (2016.01)
*H01M 8/1018* (2016.01)

(52) U.S. Cl.
CPC ....... *H01M 8/0228* (2013.01); *H01M 8/0206* (2013.01); *H01M 8/0215* (2013.01); *H01M 8/0221* (2013.01); *H01M 2008/1095* (2013.01)

(58) Field of Classification Search
CPC ............. H01M 8/0228; H01M 8/0223; H01M 8/0226; H01M 8/0221; H01M 2008/1095
See application file for complete search history.

(56) References Cited

U.S. PATENT DOCUMENTS

| | | | |
|---|---|---|---|
| 8,921,005 B2 | 12/2014 | Onishi et al. | |
| 2002/0009630 A1* | 1/2002 | Gao ..................... | H01M 8/0206 429/518 |
| 2003/0027028 A1* | 2/2003 | Davis .................. | H01M 8/0226 429/518 |
| 2003/0077515 A1* | 4/2003 | Chen ..................... | B82Y 30/00 429/231.8 |
| 2004/0106032 A1* | 6/2004 | Uejima ............... | H01M 8/0206 429/517 |
| 2005/0123816 A1* | 6/2005 | Gao .................... | H01M 8/0234 429/480 |
| 2006/0134501 A1* | 6/2006 | Lee .................... | H01M 8/0204 429/457 |
| 2008/0128287 A1* | 6/2008 | Wu ........................ | B82Y 20/00 205/109 |
| 2016/0240866 A1* | 8/2016 | Yano ....................... | C25D 5/36 |

FOREIGN PATENT DOCUMENTS

| | | | |
|---|---|---|---|
| JP | H08-185870 A | 7/1996 | |
| JP | 2009-123372 A | 6/2009 | |
| JP | 2017-112051 A | 6/2017 | |
| WO | WO2015059857 | * | 4/2015 |

* cited by examiner

*Primary Examiner* — Ula C Ruddock
*Assistant Examiner* — Matthew W Van Oudenaren
(74) *Attorney, Agent, or Firm* — Dickinson Wright PLLC

(57) ABSTRACT

A fuel cell separator having high corrosion resistance even in an environment where fluoride ions are present, which is a fuel cell separator comprising a metal base material, a tin oxide film provided on a surface of the metal base material, and a conductive polymer film provided at least on an area exposed due to a defect present on the tin oxide film on the surface of the metal base material.

6 Claims, 3 Drawing Sheets

FUEL CELL SEPARATOR AND METHOD FOR PRODUCING THE SAME

CROSS REFERENCE TO RELATED APPLICATIONS

The present application claims priority from Japanese patent application JP 2017-244750 filed on Dec. 21, 2017, the content of which is hereby incorporated by reference into this application.

BACKGROUND

Technical Field

Exemplary embodiments relate to a fuel cell separator and a method for producing the same.

Description of Background Art

A polymer electrolyte fuel cell comprises a membrane electrode assembly (MEA) comprising an ion permeable electrolyte membrane, an anode-side catalyst layer (electrode layer) and a cathode-side catalyst layer (electrode layer) which sandwiches the electrolyte membrane. Usually, a gas diffusion layer (GDL) for supplying a fuel gas or an oxidant gas and collecting electric power generated by an electrochemical reaction is formed on each side of MEA. Such membrane electrode assembly provided with GDL on each side thereof is referred to as a "membrane electrode & gas diffusion layer assembly (MEGA)." MEGA is sandwiched by a pair of separators.

Polymer electrolyte fuel cell separators are required to have high gas impermeability in order to supply a fuel gas and an oxidation gas completely separately to an electrode and need to have high conductivity in order to increase power generation efficiency. Further, polymer electrolyte fuel cell separators are required to have excellent corrosion resistance.

As a conventional separator example, a solid oxide fuel cell separator comprising: a separator substrate composed of a cermet containing a heat-resistant metal containing an alloy comprising chromium at a content of 5% or more and ceramics; and a protection film of a metal oxide such as Sb-doped tin oxide, which is provided on one side of the substrate that is brought into contact with a cathode gas such that the substrate is not directly brought into contact with the cathode gas, has been disclosed (JP Patent Publication (Kokai) No. H8-185870 A (1996)).

SUMMARY

The exemplary embodiments are based on a finding that the tin oxide film of the separator described above (JP Patent Publication (Kokai) No. H8-185870 A (1996)) has fine defects and the defects promote corrosion of the base material. In other words, it was revealed that when a metal base material such as SUS is used as a base material for separators, a solution containing fluoride ions from a fluorine polymer electrolyte membrane such as Nafion (registered trademark) penetrates defects in a tin oxide film, which may cause elution of Fe from an SUS base material. Eluted Fe functions as a catalyst to generate hydrogen peroxide (Fenton reaction), which could cause degradation of Nafion as an MEGA electrolyte membrane and deterioration of fuel cell power generation performance.

Therefore, the exemplary embodiments relate to providing a fuel cell separator having high corrosion resistance even in an environment where fluoride ions are present and a method for producing the same.

According to the exemplary embodiments, the above objective can be achieved by film formation of a conductive polymer film on areas of a metal base material which are exposed due to defects of a tin oxide film in a fuel cell separator in which the metal base material is covered with the tin oxide film. Specifically, the exemplary embodiments are summarized as follows.

(1) A fuel cell separator, which comprises a metal base material, a tin oxide film provided on a surface of the metal base material, and a conductive polymer film provided at least on an area exposed due to a defect present on the tin oxide film on the surface of the metal base material.

(2) The fuel cell separator according to (1), wherein the conductive polymer film contains polyethylenedioxythiophene.

(3) The fuel cell separator according to (1), wherein the surface sulfur concentration is 2 atm. % or more.

(4) A method for producing a fuel cell separator, which comprises the steps of:

preparing a metal base material having a surface on which a tin oxide film is formed;

applying a solution of a conductive polymer or a precursor thereof to the surface of the metal base material; and impregnating a defect present on the tin oxide film with the solution and drying the solution.

(5) The method for producing a fuel cell separator according to (4), wherein the conductive polymer or a precursor thereof is ethylenedioxythiophene.

(6) The method for producing a fuel cell separator according to (4), wherein the concentration of the conductive polymer or a precursor thereof in the solution is 4% to 6% by weight.

According to the exemplary embodiments, a metal base material, which is exposed in an area of a defect of a tin oxide film, is covered with a conductive polymer film to reduce elution of Fe or the like, thereby making it possible to suppress corrosion of the metal base material. Therefore, a fuel cell separator having high corrosion resistance even in an environment where fluoride ions are present can be obtained.

DETAILED DESCRIPTION OF THE EMBODIMENTS

The exemplary embodiments are described below in detail.

Figure 1:
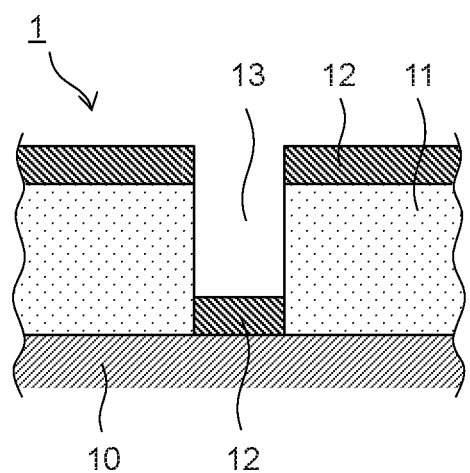
FIG. 1 schematically shows a magnified cross-sectional view of the fuel cell separator in the exemplary embodiments.

FIG. 1 schematically shows a magnified cross-sectional view of the fuel cell separator in the exemplary embodiments (hereinafter simply referred to as a "separator"). A separator 1 in this embodiment is provided with a metal base material 10 and a tin oxide film 11 formed on a surface of the metal base material.

The separator 1 is a member having features such as excellent conductivity, and gas impermeability. For example, the separator 1 is formed to have a wave shape, apexes of waves on one side of the separator 1 are in contact with a gas diffusion layer of MEGA in a fuel cell such that a reaction gas flow channel of a fuel gas or an oxidant gas is formed between the separator 1 and the gas diffusion layer. In addition, the other side of the separator 1 is in contact with the other side of an adjacent separator. Here, the tin oxide film 11 may be formed on only one side of the metal base material 10 on which a reaction gas flow channel is formed or on both sides of the metal base material 10. The tin oxide film 11 is formed on at least one side of the metal base material 10 on which a reaction gas flow channel is formed in some embodiments.

The metal base material 10 that may be used herein are selected from among various metal base materials that may be used for fuel cell separators. The metal base material 10 has features such as durable strength and corrosion resistance in some embodiments. Examples of a material constituting the metal base material 10 include stainless steel (SUS), copper, copper alloys, titanium, titanium alloys, nickel base materials, aluminium, aluminium alloys, magnesium alloys, and iron. In addition, as such stainless steel, any of austenite stainless steel (iron-chromium-nickel alloy), ferrite stainless steel (iron-chromium alloy), and martensite stainless steel (iron-chromium alloy) may be used. The above-described reaction gas flow channel, a cooling water flow channel, and the like may be formed by press molding or the like of the metal base material 10.

The tin oxide film 11 is stable in an oxidation atmosphere around at operation temperatures of polymer electrolyte fuel cells, and serves as a protection film for the metal base material 10. Film thickness of the tin oxide film 11 is not particularly limited. However, when it is excessively thin, the protection effect of the tin oxide film becomes insufficient. On the other hand, when it is excessively thick, as the internal stress of the tin oxide film is high, the tin oxide film 11 may be easily detached from the metal base material 10 in some cases. The film thickness is appropriately set in consideration of the balance of thickness. Specifically, the film thickness of the tin oxide film 11 is within a range of 10 nm to 300 nm in some embodiments.

The tin oxide film 11 may contain a metal oxide other than tin oxide in order to improve conductivity, for example. Examples of such metal oxide include antimony oxide, aluminium oxide, titanium oxide, zirconium oxide, tungsten oxide, and silicon oxide. In particular, antimony oxide is used in some embodiments. The contents of these metal oxides other than tin oxide may be appropriately set in accordance with types of metal oxides and the like. For example, when antimony oxide is mixed into a tin oxide film, the antimony content in the tin oxide film is within a range of 1 to 5 atm. % in some embodiments. The amount of specific atoms in the tin oxide film may be determined by analysis using, for example, X-ray photoelectron spectroscopy (XPS).

A method for forming the tin oxide film 11 is not particularly limited. For example, film formation may be carried out by physical vapor deposition (PVD) involving sputtering, vacuum deposition, ionized evaporation, or ion plating, chemical vapor deposition (CVD), or the like. In addition, when a different metal oxide such as antimony oxide is mixed into the tin oxide film 11, film formation may be carried out by, for example, performing sputtering with plasma or the like using, as a target, a sintered compact obtained by sintering particles of tin oxide, antimony oxide, or the like on the surface of the metal base material 10. By appropriately controlling the temperature of the metal base material 10 for film formation of the tin oxide film 11 (film formation temperature), applied voltage, or the like, it is possible to improve crystallinity of the tin oxide film 11 and conductivity of the tin oxide film 11, thereby further reducing contact resistance of the separator.

As shown in FIG. 1, usually at least one defect 13 is formed on the tin oxide film 11. The defect 13 is, for example, a fine pore having a diameter of about 1 to 5 nm and may be observed by means of a transmission electron microscope (TEM) or the like. The presence of the defect 13 allows a corrosion solution containing fluoride ions from a fluorine polymer electrolyte membrane such as Nafion to penetrate the defect 13 on the tin oxide film 11 (capillary action) and cause corrosion of the metal base material 10, which results in elution of Fe or the like. Eluted Fe functions as a catalyst to generate hydrogen peroxide (Fenton reaction), which may cause degradation of Nafion in an MEGA electrolyte membrane and deterioration of fuel cell power generation performance. Therefore, in this embodiment, a conductive polymer film 12 is formed on the surfaces of the tin oxide film 11 and the metal base material 10 that is exposed due to the defect 13 as shown in FIG. 1. Accordingly, elution of Fe or the like can be reduced and corrosion of the metal base material 10 can be suppressed. In FIG. 1, the conductive polymer film 12 is formed on both the surface of the tin oxide film 11 and the surface of the metal base material 10 that is exposed due to the defect 13. However, the exemplary embodiments are not limited thereto. The conductive polymer film 12 may be formed at least on an area of the defect 13 on the surface of the metal base material 10.

As a material constituting the conductive polymer film 12, any material having relatively high conductivity, which may cover the surface of the metal base material 10 to reduce elution of Fe or the like, may be used. Specific examples thereof include polythiophene and derivatives, such as polyethylenedioxythiophene (PEDOT) or polyethylenedioxythiophene/polystyrene sulfonate (PEDOT/PSS), doped polyaniline, polyphenylene vinylene, polypyrrole, polyparaphenylene, polyacetylene, and triphenyldiamine (TPD). In particular, polyethylenedioxythiophene (PEDOT) is used in some embodiments.

When the film thickness of the conductive polymer film 12 is excessively thin, the effect of preventing elution of Fe or the like cannot be obtained. Meanwhile, when it is excessively thick, it may cause an increase in volume resistance. The film thickness is appropriately set in consideration of these factors. Specifically, the thickness is within a range of 0.3 nm to 10 nm and preferably 1 nm to 5 nm, although it may vary in accordance with the type of a material constituting the conductive polymer film 12.

In addition, the surface sulfur concentration of the conductive polymer film 12, which is determined as an index, is preferably 2 atm. % or more and particularly preferably 5 atm. % or more. When the surface sulfur concentration is within the above range, the covering effect of the conductive polymer film 12 becomes sufficient and elution of the metal base material 10 on the area of the defect 13 is further reduced. The surface sulfur concentration of the conductive polymer film 12 may be determined by means of, for example, X-ray photoelectron spectroscopy (XPS).

Figure 2:
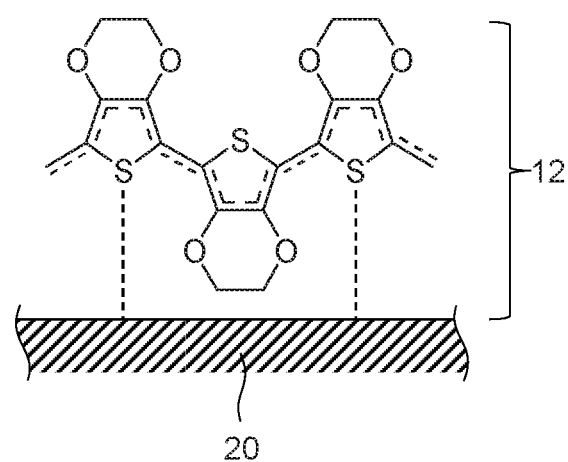
FIG. 2 schematically shows a polyethylenedioxythiophene (PEDOT) monomolecular film which is one embodiment of the conductive polymer film.

FIG. 2 schematically shows a conductive polymer film 12 comprising polyethylenedioxythiophene (PEDOT) that is formed on one surface of a metal base material or a tin oxide film 20. The conductive polymer film 12 is in the form of an extremely thin monomolecular film having a thickness of about 0.5 nm and can effectively reduce elution of Fe or the like.

The conductive polymer film 12 may contain various components including an oxidant such as iodide or paratoluenesulfonic acid and a cross-linking agent in some cases. The contents of these components other than the conductive polymer are set to amounts that do not inhibit the corrosion-suppressing effect of the conductive polymer film 12, and the total thereof is specifically less than 1% by weight in the conductive polymer film 12 in some embodiments.

Corrosion resistance of the separator 1 in FIG. 1 may be evaluated by an appropriate conventionally known means. For example, corrosion resistance may be detected by immersing a test piece of a separator in a sulfuric acid aqueous solution at 80° C. for a certain period of time and determining the amount of metal ions eluted in the sulfuric acid aqueous solution (ng/ml) by means of an ICP optical emission spectrometer or the like. Alternatively, corrosion resistance may be evaluated by LSV (linear sweep voltammetry) which is an electrochemical evaluation method.

In this embodiment, a separator 1 may be produced by the steps of: preparing a metal base material 10 having a surface on which a tin oxide film 11 is formed; applying a solution of a conductive polymer or a precursor thereof (e.g., monomer) to the surface of the metal base material 10; and impregnating defects 13 present on the tin oxide film 11 with the applied solution and drying the solution.

A solvent used for a solution of the conductive polymer or a precursor thereof may be appropriately selected depending on type of the conductive polymer or the like. Examples thereof include water, methanol, ethanol, 1-propanol, 2-propanol, 1-butanol, 2-butanol, t-butanol, ethylene glycol, propylene glycol, acetone, methyl ethyl ketone, acetonitrile, tetrahydrofuran, and dioxane. These solvents may be used alone or a mixture of two or more types thereof may be used.

The coating method is not particularly limited as long as a conductive polymer film 12 having a predetermined film thickness can be uniformly formed by the method. Examples thereof include a coating method comprising immersing a metal base material 10 in a solution (dip coating), die coating, spin coating, roll coating, spray coating, bar coating, gravure coating, ink-jet printing, screen printing, and off-set printing. The method comprising immersing a metal base material 10 in a solution is advantageous in that defects 13 can be easily impregnated with the solution in some embodiments.

When the concentration of a conductive polymer or a precursor thereof in the solution is excessively low, the covering effect of the conductive polymer film 12 becomes insufficient, while on the other hand, when the concentration is excessively high, viscosity of the solution increases, which might make it difficult to impregnate fine defects 13 on a tin oxide film 11 with the solution. In view of this, the concentration is appropriately set. Specifically, the concentration is within a range of 4% to 6% by weight in some embodiments, although it also depends on the types of the conductive polymer and the solvent.

After the solution is applied and defects are impregnated with the solution, the solution is dried and, if necessary, curing treatment (heat treatment, ultraviolet treatment, or the like) is performed. Accordingly, a conductive polymer film 12 is formed, and thus, a separator 1 may be obtained. For example, an ethanol solution of ethylenedioxythiophene (EDOT) that is a PEDOT monomer is applied and heated to 200° C. for polymerization. Thus, a conductive polymer film 12 comprising polyethylenedioxythiophene (PEDOT) may be formed.

EXAMPLES

Exemplary embodiments are more specifically described below with reference to the Examples. However, the scope of the exemplary embodiments is not limited to the Examples.

(Production of Separator)

A SUS316 plate (thickness: 0.1 mm) was prepared as a metal base material. This metal base material was placed in a vacuum container, argon gas was introduced under vacuum conditions, argon ions were generated by voltage application to allow argon ions to collide with the surface of the metal base material, thereby removing an oxide layer on the surface.

Subsequently, a mixed sintered compact of tin oxide and antimony oxide was placed as a target in a vacuum container, the metal base material was placed at a position facing the target, and the vacuum container was degassed. Then, argon was introduced as a sputtering gas into the vacuum container, argon gas was allowed to collide with the target by voltage application to cause the target atoms to be released such that the target atoms were accumulated on the metal base material, thereby forming an antimony-doped tin oxide film. The antimony content in the obtained tin oxide film was 3 atm. %.

Next, film formation of the monomolecular film of polyethylenedioxythiophene was carried out by a liquid phase method. Specifically, the above tin oxide film was immersed in an EDOT ethanol solution obtained by dissolving ethylenedioxythiophene (EDOT, Tokyo Chemical Industry, Co., Ltd.; Product code: E0741) as a monomer component in ethanol, followed by heating at 200° C. Thus, a PEDOT monomolecular film was formed as a conductive polymer film, thereby producing a separator test piece.

(Corrosion Resistance Test)

Corrosion resistance of the obtained test piece was evaluated. A potentiostatic corrosion test was conducted as a corrosion resistance evaluation test in accordance with the method for high-temperature electrochemical corrosion test of metallic materials in molten salts (JIS Z2294) of the Japanese Industrial Standards Committee. Specifically, the test piece was immersed in a sulfuric acid aqueous solution adjusted to 80° C., and the test piece in such state was allowed to maintain an electric potential of 0.9V vs SHE. NaF was dissolved in the sulfuric acid aqueous solution to adjust the fluoride ion concentration to 3000 ppm. The test time was 100 hours. After this corrosion resistance test, the amount of eluted Fe as the metal base material component and contact resistance of the test piece were evaluated. The amount of eluted Fe was quantitatively determined using an ICP optical emission spectrometer. In addition, for determination of contact resistance, gold-plated copper plates were layered on the film formation side of the metal base material, carbon paper (TGP-H-120 manufactured by Toray Industries, Inc.) was inserted between the copper plates and the metal base material, and the voltage value upon application of a constant electric current between the metal base material and the copper plates was determined with the application of pressure at 0.98 MPa per unit area. In addition, the surface sulfur concentration of the test piece was determined by X-ray photoelectron spectroscopy (XPS).

(Test Results)

Figure 3:
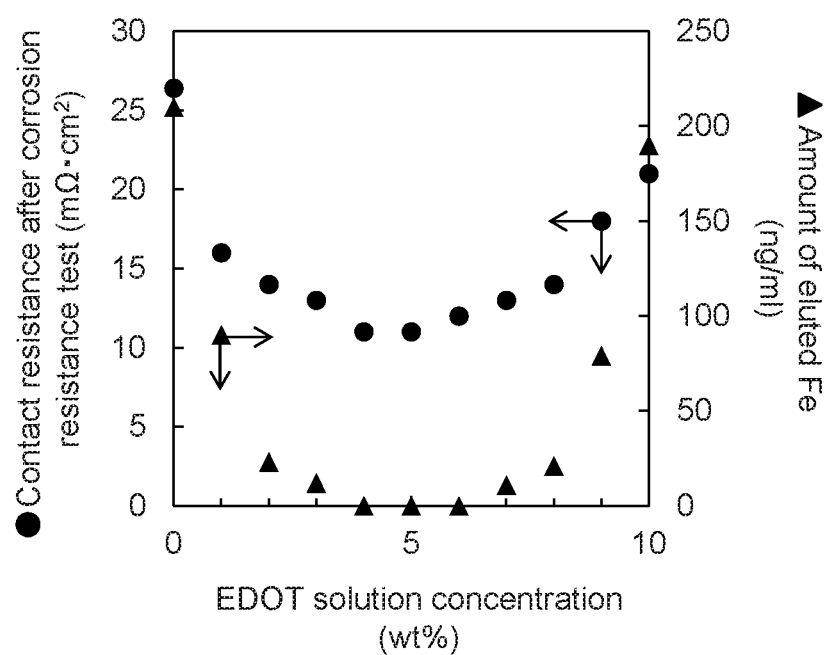
FIG. 3 is a graph showing changes in the amount of eluted Fe with respect to the EDOT solution concentration and contact resistance after the corrosion resistance test.

FIG. 3 shows the contact resistance and the amount of eluted Fe after the corrosion resistance test for test pieces each having a PEDOT monomolecular film, which were prepared at different concentrations of the EDOT ethanol solution. When the EDOT concentration was excessively low, there was a tendency that the amount of eluted Fe increased while corrosion resistance decreased. This was probably because the amount of PEDOT to be supplied was insufficient relative to the amount of PEDOT required for covering the exposed metal base material. However, even in a region with a low EDOT concentration (e.g., 1% by weight), the effect of suppressing corrosion of the metal base material was significant as compared with the conventional separator provided with a tin oxide film alone. Meanwhile, as shown in FIG. 3, when the EDOT concentration was excessively high, the corrosion resistance also tended to decrease. This was probably because the viscosity of the EDOT ethanol solution increased, which made it difficult for the EDOT ethanol solution to penetrate fine defects on the tin oxide film, thereby preventing the EDOT ethanol solution from reaching the metal base material. In view of the above, the optimum EDOT ethanol solution concentration is considered to be 4% to 6% by weight. Note that the surface sulfur concentration in the test piece at an EDOT ethanol solution concentration of 4% by weight was 2 atm. %. Accordingly, the optimum surface sulfur concentration is considered to be 2 atm. % or more.

DESCRIPTION OF SYMBOLS

1: Separator
10: Metal base material
11: Tin oxide film
12: Conductive polymer film
13: Defect
20: Metal base material or tin oxide film

What is claimed is:

1. A fuel cell separator, which comprises a metal base material, a tin oxide film provided on a surface of the metal base material, and a conductive polymer film provided at least on an exposed area of said metal base material due to a defect present on the tin oxide film on the surface of the metal base material, wherein the defect comprises a fine pore having a diameter of 1 to 5 nm.

2. The fuel cell separator according to claim 1, wherein the conductive polymer film contains polyethylenedioxythiophene.

3. The fuel cell separator according to claim 1, wherein the surface sulfur concentration is 2 atm. % or more.

4. A method for producing a fuel cell separator, which comprises the steps of:
preparing a metal base material having a surface on which a tin oxide film is formed;
applying a solution of a conductive polymer or a precursor thereof to the surface of the metal base material; and
impregnating a defect present on the tin oxide film with the solution and drying the solution to form a conductive polymer film on an area of said metal base material exposed by the defect in the tin oxide film, wherein the defect comprises a fine pore having a diameter of 1 to 5 nm.

5. The method for producing a fuel cell separator according to claim 4, wherein the conductive polymer or a precursor thereof is ethylenedioxythiophene.

6. The method for producing a fuel cell separator according to claim 4, wherein the concentration of the conductive polymer or a precursor thereof in the solution is 4% to 6% by weight.

* * * * *